(12) United States Patent
Rabinowitz

(10) Patent No.: US 7,878,667 B2
(45) Date of Patent: Feb. 1, 2011

(54) LATCHING SOLAR CONCENTRATOR PIVOTED MIRRORS DURING OFF-POWER PERIOD

(76) Inventor: Mario Rabinowitz, 715 Lakemead Way, Redwood City, CA (US) 94062

( * ) Notice: Subject to any disclaimer, the term of this patent is extended or adjusted under 35 U.S.C. 154(b) by 383 days.

(21) Appl. No.: 11/937,504

(22) Filed: Nov. 9, 2007

(65) Prior Publication Data

US 2009/0120428 A1     May 14, 2009

(51) Int. Cl.
*G02B 7/182*     (2006.01)
*G02B 7/198*     (2006.01)
*F24J 2/10*     (2006.01)

(52) U.S. Cl. .................... 359/872; 359/900; 126/684; 126/696; 248/481; 353/3

(58) Field of Classification Search ............ 359/872, 359/900; 126/600, 684, 696; 248/467, 481; 353/3
See application file for complete search history.

(56) References Cited

U.S. PATENT DOCUMENTS

| | | | | |
|---|---|---|---|---|
| 1,430,379 | A * | 9/1922 | Hubbell ............... 359/602 |
| 3,863,662 | A | 2/1975 | Zehr |
| 3,905,352 | A * | 9/1975 | Jahn ................. 126/578 |
| 4,110,009 | A * | 8/1978 | Bunch ............... 359/853 |
| 4,194,437 | A * | 3/1980 | Rosheim ............. 92/120 |
| 4,209,222 | A * | 6/1980 | Posnansky .......... 359/359 |
| 4,218,114 | A * | 8/1980 | Bunch ............... 359/853 |
| 4,317,031 | A * | 2/1982 | Findell ............ 250/203.4 |
| 4,365,616 | A * | 12/1982 | Vandenberg ......... 126/581 |
| 4,605,507 | A * | 8/1986 | Windgassen et al. ... 508/152 |
| 4,906,089 | A * | 3/1990 | Biondi et al. ........ 359/843 |
| 5,222,277 | A | 6/1993 | Harvey |
| 5,755,526 | A * | 5/1998 | Stanevich .......... 403/122 |
| 5,927,891 | A * | 7/1999 | Trumbower et al. ..... 403/114 |
| 6,154,302 | A * | 11/2000 | Yagi et al. ......... 359/198.1 |
| 6,197,228 | B1 | 3/2001 | Sheridon |
| 6,211,998 | B1 | 4/2001 | Sheridon |
| 6,262,707 | B1 | 7/2001 | Sheridon |
| 6,542,283 | B1 | 4/2003 | Sheridon |
| 6,698,693 | B2 | 3/2004 | Rabinowitz |

(Continued)

FOREIGN PATENT DOCUMENTS

WO     PCT/US02/20199     6/2002

OTHER PUBLICATIONS

Shah; "Lubricating Greases"; Chapter 13 of Significance of Tests for Petroleum Products; ASTM International; 2003; pp. 149-168.*

*Primary Examiner*—Ricky D Shafer

(57) ABSTRACT

A novel latch for pivoted optical elements of a solar concentrator and other equipment latches them in position between orientation operations. The mirrors may be on a universal pivot that can rotate or tilt in any direction; or on gimbal pivots. The orientation power can be turned off between alignments with the mirrors remaining in alignment orientation during this off-power period. Turning off the alignment power between alignments, saves on both energy resources and on expensive apparatus. It permits a great reduction in power supply as the optical elements can be aligned sequentially. This not only reduces operating costs, but also capital investment because smaller power supplies can suffice. A preferred embodiment utilizes the freezing of a liquid material. Since this involves no moving parts for latching, the instant invention is ideally adapted for fabrication from the nano- to the mini-realm.

10 Claims, 3 Drawing Sheets

U.S. PATENT DOCUMENTS

| | | |
|---|---|---|
| 6,959,993 B2 | 11/2005 | Gross et al. |
| 6,964,486 B2 * | 11/2005 | Rabinowitz ................. 359/851 |
| 6,975,445 B1 | 12/2005 | Rabinowitz |
| 6,988,809 B2 | 1/2006 | Rabinowitz |
| 7,051,656 B1 | 5/2006 | Koehler et al. |
| 7,115,881 B2 | 10/2006 | Rabinowitz |
| 7,125,128 B2 * | 10/2006 | Novak ........................ 359/849 |
| 7,130,102 B2 | 10/2006 | Rabinowitz |
| 7,133,183 B2 | 11/2006 | Rabinowitz |
| 7,156,088 B2 | 1/2007 | Luconi |
| 7,187,490 B2 | 3/2007 | Rabinowitz |
| 7,192,146 B2 | 3/2007 | Gross et al. |
| 7,195,036 B2 | 3/2007 | Burns et al. |
| 7,354,168 B2 * | 4/2008 | Holderer et al. ............. 359/851 |
| 7,473,001 B2 * | 1/2009 | Schalkwijk et al. ......... 359/841 |
| 7,501,572 B1 * | 3/2009 | Rabinowitz ................. 136/246 |
| 7,677,241 B2 * | 3/2010 | Hickerson .................. 126/600 |
| 2008/0170312 A1 * | 7/2008 | Rabinowitz ................. 359/853 |

* cited by examiner

LATCHING SOLAR CONCENTRATOR PIVOTED MIRRORS DURING OFF-POWER PERIOD

FIELD OF THE INVENTION

The instant invention relates generally to pivoted equipment and more specifically to a Solar Energy Concentrator Fresnel reflector array that tracks the sun and focuses the reflected light by alignment of pivoted elements (mirrors, etc). The mirrors may be on a universal pivot that can rotate or tilt in any direction; or on gimbal pivots. The instant invention specifically teaches method and apparatus for latching the pivoted mirrors so that orientation power can be turned off between alignments with the mirrors remaining in alignment orientation during this off-power period.

BACKGROUND OF THE INVENTION

This invention provides a better means to achieve affordable solar energy than by a conventional tracking heliostat array. In the latter, enabling the optical elements (mirrors, refractors, lenses, etc.) to be movable generally requires many large heavy motors that consume a great deal of power. This results in an expensive, bulky, and ponderous heliostat that is unfavorable for rooftop and other applications where much weight cannot be tolerated. The present invention functions in solar concentrators and similar equipment much the same as parabolic dish and parabolic trough concentrators, without their disadvantages of bulk and weight. It is advantageous to turn off the alignment power between alignments as this not only reduces operating costs, but also capital investment because smaller power supplies can suffice. Most prior art systems either require large power consumption to overcome friction, or need to keep the power on to maintain the angular alignment of the optical elements (mirrors, refractors, lenses, etc.) The instant invention provides latching of the pivoted mirrors in the off-power mode.

DESCRIPTION OF THE PRIOR ART

No prior art was found related to latching of the pivoted mirrors in the off-power mode. The prior art has investigated mirrored ball alignment preservation where the balls are in concentric cavities; and mirrored ball alignment preservation where the balls are between two egg crate like sheets; but not for pivoted mirrors, nor by the teaching of the instant patent. No prior art was found that utilized latching techniques of pivoted mirrors in a Fresnel reflector solar concentrator, optical switches, displays, or other similar equipment. The instant invention teaches novel latching not only for solar concentrators, but a latching liquid solidification technique that is generally novel for a wide variety of applications that require latching of a pivot or gimbals that need not involve pivoted mirrors.

INCORPORATION BY REFERENCE

In a solar energy application (as well as other functions), adjustable reflecting elements are an important feature of a Fresnel reflector solar concentrator which tracks the sun and directs the sunlight to a receiver as described in the following patents and published papers. The following U.S. patents, and Solar Journal publication are fully incorporated herein by reference.

1. U.S. Pat. No. 7,247,790 by Mario Rabinowitz, "Spinning Concentrator Enhanced Solar Energy Alternating Current Production" issued on Jul. 24, 2007.
2. U.S. Pat. No. 7,187,490 by Mario Rabinowitz, "Induced Dipole Alignment Of Solar Concentrator Balls" issued on Mar. 6, 2007
3. U.S. Pat. No. 7,133,183 by Mario Rabinowitz, "Micro-Optics Solar Energy Concentrator" issued on Nov. 7, 2006.
4. U.S. Pat. No. 7,130,102 by Mario Rabinowitz, "Dynamic Reflection, Illumination, and Projection" issued on Oct. 31, 2006.
5. U.S. Pat. No. 7,115,881 by Mario Rabinowitz and Mark Davidson, "Positioning and Motion Control by Electrons, Ions, and Neutrals in Electric Fields" issued on Oct. 3, 2006.
6. U.S. Pat. No. 7,112,253, by Mario Rabinowitz, "Manufacturing Transparent Mirrored Mini-Balls for Solar Energy Concentration and Analogous Applications" issued on Sep. 26, 2006.
7. U.S. Pat. No. 7,077,361, by Mario Rabinowitz, "Micro-Optics Concentrator for Solar Power Satellites" issued on Jul. 18, 2006.
8. U.S. Pat. No. 6,988,809 by Mario Rabinowitz, "Advanced Micro-Optics Solar Energy Collection System" issued on Jan. 24, 2006.
9. U.S. Pat. No. 6,987,604 by Mario Rabinowitz and David Overhauser, "Manufacture of and Apparatus for Nearly Frictionless Operation of a Rotatable Array of Micro-Mirrors in a Solar Concentrator Sheet" issued on Jan. 17, 2006.
10. U.S. Pat. No. 6,975,445 by Mario Rabinowitz, "Dynamic Optical Switching Ensemble" issued on Dec. 13, 2005.
11. U.S. Pat. No. 6,964,486 by Mario Rabinowitz, "Alignment of Solar Concentrator Micro-Mirrors" issued on Nov. 15, 2005.
12. U.S. Pat. No. 6,957,894 by Mario Rabinowitz and Felipe Garcia, "Group Alignment Of Solar Concentrator Micro-Mirrors" issued on Oct. 25, 2005.
13. U.S. Pat. No. 6,843,573 by Mario Rabinowitz and Mark Davidson, "Mini-Optics Solar Energy Concentrator" issued on Jan. 18, 2005.
14. U.S. Pat. No. 6,738,176 by Mario Rabinowitz and Mark Davidson, "Dynamic Multi-Wavelength Switching Ensemble" issued on May 18, 2004.
15. U.S. Pat. No. 6,698,693 by Mark Davidson and Mario Rabinowitz, "Solar Propulsion Assist" issued on Mar. 2, 2004.
16. U.S. Pat. No. 6,612,705 by Mark Davidson and Mario Rabinowitz, "Mini-Optics Solar Energy Concentrator" issued on Sep. 2, 2003.
17. Solar Energy Journal, Vol. 77, Issue #1, 3-13 (2004) "Electronic film with embedded micro-mirrors for solar energy concentrator systems" by Mario Rabinowitz and Mark Davidson.

DEFINITIONS

"Adjustable Fresnel reflector" is a variable focusing planar reflecting surface much like a planar Fresnel lens is a focusing transmitting surface. Heuristically, it can somewhat be thought of as the projection of thin variable-angular segments of small portions of a thick focusing mirror upon a planar surface whose angles can be adjusted with respect to the planar surface.

"Concentrator" as used herein in general is an adjustable array of mirrors for focusing and reflecting light. In a solar energy context, it is that part of a Solar Collector system that directs and concentrates solar radiation onto a solar Receiver.

"Dielectric" refers to an insulating material in which an electric field can be sustained with a minimum power dissipation.

"Electric field" or "electric stress" refers to a voltage gradient. An electric field can produce a force on charged objects, as well as neutral objects. The force on neutral objects results from an interaction of the electric field on intrinsic or induced electric polar moments in the object.

"Electrical breakdown" occurs when a high enough voltage or electric field is applied to a dielectric (vacuum, gas, liquid, or solid) at which substantial electric charge is caused to move through the dielectric.

"Enhanced or macroscopic electric field" is the electric field enhanced by whiskers very near the electrodes based upon the local (microscopic) geometry on the surface of the electrodes.

"Field emission or cold emission" is the release of electrons from the surface of a cathode (usually into vacuum) under the action of a high electrostatic field $\sim 10^7$ V/cm and higher. The high electric field sufficiently thins the potential energy barrier so that electrons can quantum mechanically tunnel through the barrier even though they do not have enough energy to go over the barrier. This is why it is also known as "cold emission" as the temperature of the emitter is not elevated.

"Focusing planar mirror" is a thin almost planar mirror constructed with stepped varying angles so as to have the optical properties of a much thicker concave (or convex) mirror. It can heuristically be thought of somewhat as the projection of thin equi-angular segments of small portions of a thick mirror upon a planar surface. It is a focusing planar reflecting surface much like a planar Fresnel lens is a focusing transmitting surface. If a shiny metal coating is placed on a Fresnel lens it can act as a Fresnel reflector.

"Gimbals are a two or more axis mount consisting of two or more rings mounted on axes at right angles to each other. An object mounted on a three ring gimbal can remain horizontally suspended on a plane between the rings regardless as to the stability of the base.

"Induced Electric dipole" refers to the polarization of negative and positive charge produced by the application of an electric field.

"Latch" as used herein refers to a device for the clasping, securing, and generally holding a pivot or gimbal from moving until the latch is released.

"Low melting point material" is a substance which at low temperature becomes liquid such as low melting point metals, low melting point plastics, and/or low melting point alloys. It is preferable that such a material be solid above the ambient operating temperature of the device, and become liquid at a temperature not much higher than twice the ambient operating absolute temperature.

"Macroscopic electric field" 'is the applied electric field on the basis of the imposed voltage and the gross (macroscopic) geometry of the electrodes, and which is relevant as long as one is not too near the electrodes.

"Optical elements" are the mirrors, reflectors, focusers, etc. of a concentrator array. As a focuser the optical element may be a lens or include a lens.

"Pawl" is a lever, tooth, or bar whose free end rests against the teeth of a ratchet. When the ratchet is rotated in one direction, the pawl rises and goes back into place. The pawl resists motion of the ratchet in the opposite direction.

"Ratchet" is a wheel with anisotropic teeth so that the pawl favors one direction of rotation, and resists rotation in the opposite direction.

"Opposed ratchets" is defined herein as two ratchets with teeth facing in opposite directions so that a given orientation is locked from rotation in any direction until one or both pawls are released. Each ratchet can be at the opposite end of an axis of rotation, or both ratchets can be mounted back-to-back at the same pivot.

SUMMARY OF THE INVENTION

Pivoted optical elements of a solar concentrator and other equipment need to be held (latched) in position between orientation operations. The mirrors may be on a universal pivot that can rotate or tilt in any direction; or on gimbal pivots. The instant invention specifically teaches method and apparatus for latching the pivoted mirrors so that orientation power can be turned off between alignments with the mirrors remaining in alignment orientation during this off-power period. Turning off the alignment power between alignments, saves on both energy resources and on expensive apparatus. It permits a great reduction in power supply as the optical elements can be aligned sequentially.

Thus latching of the elements makes sequential use of the same voltage source feasible. Only intermittent alignment of the elements is necessary in the tracking of the sun, so a pulsed or step function voltage source may be used sequentially. An intermittent use of a voltage source is cheaper and much less difficult to achieve than the same steady state voltage powering all the elements simultaneously. This not only reduces operating costs, but also capital investment because smaller power supplies can suffice. Most prior art systems either require large power consumption to overcome friction, or need to keep the power on to maintain the angular alignment of the optical elements (mirrors, refractors, lenses, etc.) The above benefits are all provided by the latching of the pivoted elements in the power off mode, as taught by the instant invention.

The pivoted mirrors can be aligned by any of a number of different techniques. One way is by torque produced by the interaction of an induced dipole and/or a permanent dipole (e.g. electret). This is taught in U.S. Pat. No. 6,964,486, "Alignment of Solar Concentrator Micro-Mirrors" by Mario Rabinowitz, issued on Nov. 15, 2005. This is also taught in U.S. Pat. No. 7,187,490, "Induced Dipole Alignment Of Solar Concentrator Balls" by Mario Rabinowitz, issued on Mar. 6, 2007. Another way is by electric wind motive force as taught in U.S. Pat. No. 7,115,881, "Positioning and Motion Control by Electrons, Ions, and Neutrals in Electric Fields" by Mario Rabinowitz and Mark Davidson, issued on Oct. 3, 2006.

The instant invention teaches method and apparatus for latching of the rotatable optical elements by any of a large number of ways. These include:
1. Flexible detent.
2. Magnetic activated latch.
3. Electrostatically activated latch.
4. Friction in pivots.
5. Spring mounted against a multi-sided polyhedron pivot.
6. Ratchet and wheel. The pawl (tooth) can be spring loaded and activated. Or the pawl can be magnetically, electromagnetically, and/or electrostatically activated.
7. Keyway (slot or hole) and pin.
8. A preferred embodiment is to have a low melting point material (metal or plastic) at the pivot points of gimbals, or at the base of a universal pivot. A heating device such as an electrical resistor can be embedded near the material so that with the applications of a small amount of heat, the material melts allowing alignment. The heat is removed following alignment, so the material solidifies to rigidly hold the element in position until the next alignment.

Although the primary application of the instant invention is for a solar concentrator application, there are a number of other applications such as mirrored illumination and projection, optical switching, solar propulsion assist, and non-optical applications. In general the instant invention applies to any pivot, gimbal, or joint which needs to be able to move, and then needs to be rigidly held in place without the continued application of power.

Latching pivoted mirrors have been developed for adjustable Fresnel reflectors in a solar concentrator. There are many aspects and applications of this invention, which provides techniques applicable individually or in combination for motion control in general, and for latching of the optical elements of a solar concentrator and similar equipment. The broad general concept of this invention can be used in a wide variety of fields and applications. The instant invention can perform dynamic motion control over a wide range of dimensions from nanometers through the macro-range in a broad scope of applications. Furthermore, the instant invention permits less costly and greater ease of manufacture while providing well-defined latching and position control.

It is a general aspect of this invention to provide latching of a pivoted system.

Another general aspect of this invention to provide a position latching system of an optical system.

Another aspect of the instant invention is to produce power-off latching of the elements of a solar concentrator.

An aspect of the invention is to permit continuous rotation of the elements of a solar concentrator followed by latching in a power-off period.

An aspect of this invention is to produce rotation with the ability to stop and hold the elements of a solar concentrator.

Other aspects and advantages of the invention will be apparent in a description of specific embodiments thereof, given by way of example only, to enable one skilled in the art to readily practice the invention singly or in combination as described hereinafter with reference to the accompanying drawings. In the detailed drawings, like reference numerals indicate like components.

GLOSSARY

The following is a glossary of components and structural members as referenced and employed in the instant invention with like reference alphanumerics indicating like components:
1—element (e.g. optical or non-optical constituent that is rotatable)
2—support axis (joins pivot and optical element)
7—gimbal pivots with 2 axes of rotation
8—support structure
9—universal pivot that can rotate or tilt in any direction
10—solidifiable liquid material
11—circumscribed bearing
18—lubricating dielectric fluid
45—transparent sheet
a—pawl
b—ratchet
R—heating resistor
L—inductor

DETAILED DESCRIPTION OF THE PRESENTLY PREFERRED EMBODIMENTS

As is described here in detail, the objectives of the instant invention may be accomplished by any of a number of ways separately or in combination, as taught by the instant invention. A pivoted system has been developed in which the orientation of individual elements (mirrors, reflectors, lenses, and non-optical elements) is latched as taught herein. Thus for example, a mirror array solar concentrator can operate with less power consumption, be less expensive, be more reliable, and be lighter in weight than conventional solar arrays.

Figure 1A:
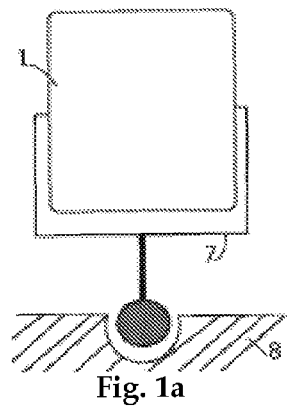
FIG. 1a is a front cross-sectional view of a gimbaled rectangular mirror that is one member of a group of optical elements that can be latched.

FIG. 1a is a front cross-sectional view of a rectangular optical element (mirror) 1 supported by gimbals 7, which are mounted on a support 8. The gimbals 7 are preferably made of a dielectric insulating material to minimize problems related to electrical breakdown and field emission.

Figure 1B:
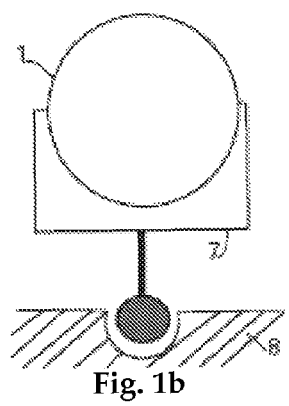
FIG. 1b is a front cross-sectional view of a gimbaled circular mirror that is one optical element of a group of optical elements that can be latched.

FIG. 1b is a front cross-sectional view of a circular optical element (mirror) 1 supported by gimbals 7, which are mounted on a support 8. The gimbals 7 are preferably made of a dielectric insulating material to minimize problems related to electrical breakdown and field emission.

Figure 1C:
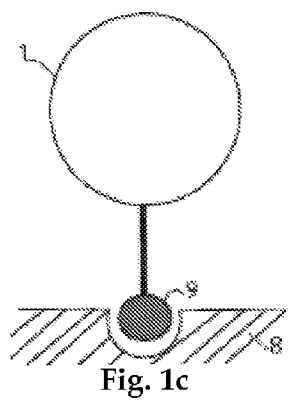
FIG. 1c is a front cross-sectional view of a circular mirror that is on a universal pivot, that is one optical element of a group of optical elements that can be latched.

FIG. 1c is a front cross-sectional view of a circular optical element (mirror) 1 supported by a universal pivot 9 mounted on a support 8. This element can be one optical member of an adjustable Fresnel reflector solar concentrator. The support axis that joins the pivot and optical element is preferably made of a dielectric insulating material to minimize problems related to electrical breakdown and field emission.

Figure 2:
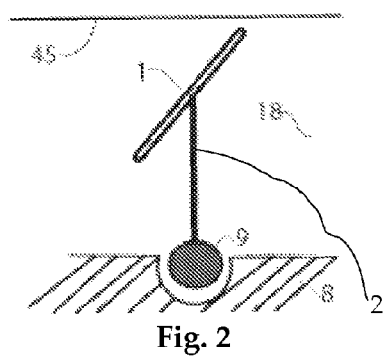
FIG. 2 is a side profile view of a rotatable element (mirror) in a fluid and supported by a universal pivot that that can be latched.

FIG. 2 is a side profile view of a rotatable element 1, joined to a support axis 2 carried by a universal pivot 9 which is mounted on a support 8, all of which are immersed in a contained fluid 18 and covered by a transparent sheet 45. The array of such elements can be in air without the covering protection of a transparent sheet 45. However the covering protection of a transparent sheet 45 is preferable as is the fluid 18 (or vacuum). The fluid 18 serves as lubricant and corrosion resistant medium. The fluid 18 is also preferable to increase the dielectric strength, and as such a contained fluid with high dielectric strength and low dielectric constant is preferable. The support axis 2 that joins the pivot 9 and element 1 is preferably made of a dielectric insulating material to minimize problems related to electrical breakdown and field emission.

As shown, the pivot 9 is below the rotatable element 1. The pivot 9 can also be above the rotatable element 1, so that the element 1 hangs down. This has the advantage that the approximately vertical position of the support axis 2 is a stable position. This has the disadvantage that the support axis 2 occludes a little bit of light in optical applications such as a solar concentrator. Furthermore, a liquid material latch needs closer tolerance between the pivot ball and the circumscribed bearing so that it does not leak out.

Figure 3:
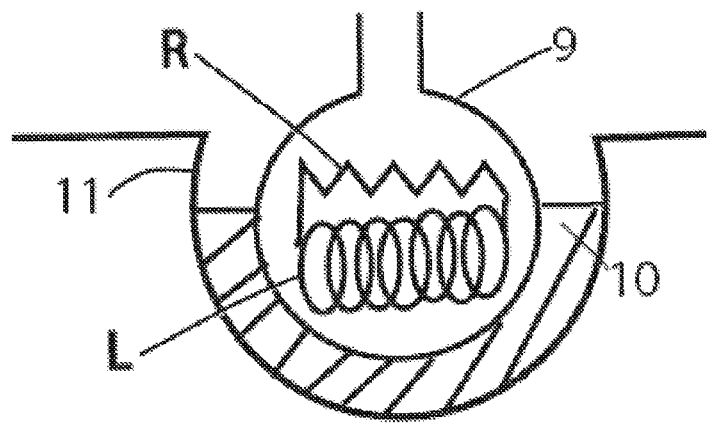
FIG. 3 is a cross-sectional schematic illustration of a pivot ball immersed in a low-melting point material inside a circumscribed bearing, showing a heating resistor embedded in the pivot ball.

FIG. 3 is an enlarged cross-sectional view of a pivot 9 which is immersed in a low-melting point solidifiable liquid material 10 inside a circumscribed bearing 11, showing a heating resistor R and an inductor L embedded in the pivot 9. Heat by resistive heating of resistor R, from electrical power coupled inductively via inductor L, causes the material 10 to go into the liquid state so that the pivot 9 can be rotated. When the electrical power is turned off, the material 10 cools and solidifies to rigidly latch (hold) the element joined to the pivot 9, until the next alignment. The solidifiable liquid material 10 latch is the preferred embodiment of the instant invention as it allows an essentially continuous locking of orientations.

Figure 4:
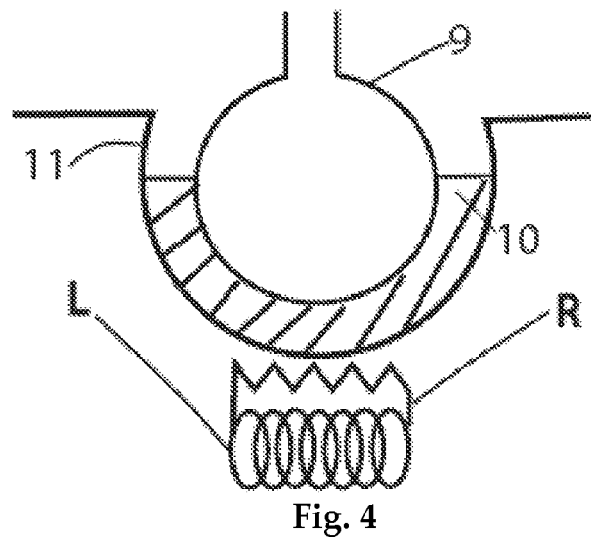
FIG. 4 is a cross-sectional schematic illustration of a pivot immersed in a low-melting point material inside a circumscribed bearing, showing a heating resistor embedded outside of, but near, the pivot.

FIG. 4 is an enlarged cross-sectional view of a pivot 9 which is immersed in a low-melting point solidifiable liquid material 10 inside a circumscribed bearing 11, showing a heating resistor R and an inductor L embedded outside of, but near, the pivot 9. Heat by resistive heating of resistor R, from electrical power coupled inductively via inductor L, causes the material 10 to go into the liquid state so that the pivot 9 can be rotated. Instead of inductive coupling to an external power source, wires from the resistor R can be brought out to the power supply. When the electrical power is turned off, the material 10 cools and solidifies to rigidly latch (hold) the element joined to the pivot 9, until the next alignment. The heating resistor R and inductor L can also be embedded in the solidifiable liquid material 10. The pivot 9 may be roughened or otherwise made irregular to avoid slippage between the pivot 9 and the solidified material 10.

Figure 5:
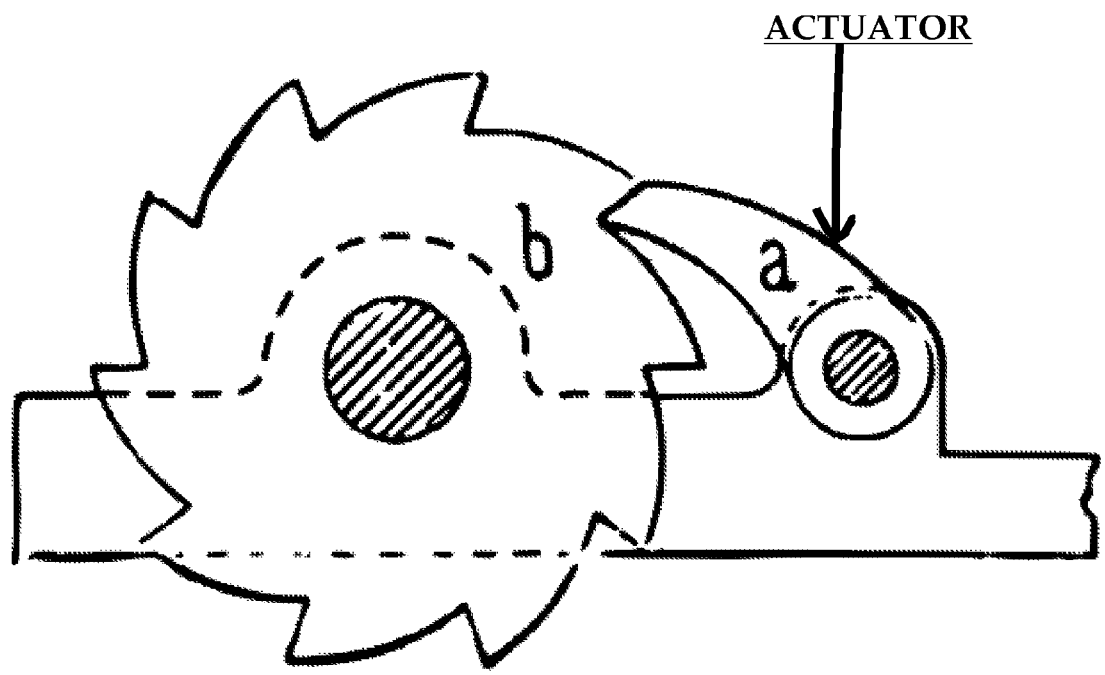
FIG. 5 is a side cross-sectional view of a ratchet and pawl with a generalized actuator.

FIG. 5 is a side cross-sectional view of a ratchet b and pawl (tooth) a with a generalized "Actuator" to lock or unlock the pawl "a". The pawl "a" can be spring loaded and activated by the activator. Or the pawl can be magnetically, electromagnetically, and/or electrostatically activated by the activator. A set of opposed ratchets can be utilized wherein two ratchets have teeth facing in opposite directions so that a given orientation is locked from rotation until one or both pawls are released. Each ratchet can be at the opposite end of an axis of rotation, or both ratchets can be mounted back-to-back at the same pivot. This is advantageous for fixed latching over pin and keyway systems in that more fixed positions are easily obtained. However the most desirable latch is the one described by FIGS. 4 and 5, as the solidifiable liquid material 10 latch permits an essentially continuous fixing of orientations.

Figure 6:
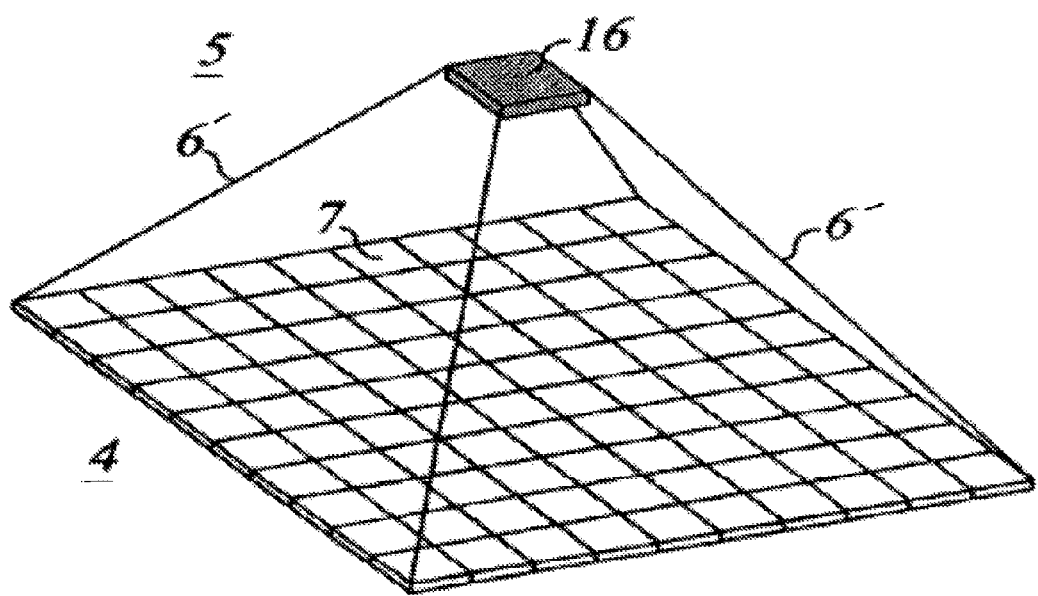
FIG. 6 is a perspective view of a solar collection system utilizing an ensemble of pivoted mirrors inside transparent square compartments, which together with a receiver form a solar concentrator system.

FIG. 6 is a perspective view of a solar collection system 5 consisting of a solar concentrator 4 and a receiver 16 above it. The concentrator 4 is an ensemble of optical units such as pivoted mirrors inside transparent square compartments. The receiver 16 is supported by rods 6'. The concentrator 4 as shown is preferably made up of separate modules shown here as transparent square compartments containing for example the mirrors on pivoted gimbals 7 that are shown in FIGS. 1a and 1b. The solar concentrator ensemble of pivoted mirrors 4 focus concentrated solar energy onto the receiver 16.

Discussion

Now that the instant invention has been described and the reader has a reasonable understanding of it, let us discuss low melting point materials that can act as latches by gripping the universal pivot, or the pivots of gimbals when these materials are solidified. There is enough choice of materials that we can eliminate toxic materials like cadmium (Cd) and lead (Pb). The materials described below are presently considered non-toxic.

I. Elements and Alloys That Can Be Used for the Latching Material

Of the pure elements Bismuth (Bi) is desirable both because it is relatively inexpensive, and because it expands slightly (~3%) upon freezing. Bismuth and many of its alloys expand slightly on freezing making for a stronger latch than otherwise. Interestingly few materials expand upon freezing as does water. The expansion property of water appears essential for life on earth.

Some Desirable Pure Elements and their Melting Points

| | |
|---|---|
| Bismuth (Bi) | 271.3° C. |
| Gallium (Ga) | 29.8° C. |
| Indium (In) | 156.6° C. |
| Iodine (I) | 113.5° C. |
| Rubidium (Rb) | 38.9° C. |
| Sulfur (S) | 112.8° C. |

Gallium alloys tend to have even lower melting points than Ga. However Ga is expensive, and can also be corrosive by intergranular boundary attack of some metals.

Some Desirable Bismuth Alloys and their Melting Points

| | |
|---|---|
| Bi(49.5%)Pb(17.6%)Sn(11.6%)In(21.3%) | 58.2° C. |
| Bi(32.5%)Sn(16.5%)In(51.0%) | 60.5° C. |
| Bi(33.0%)Sn(67.0%) | 70° C. |

I. Plastic Candidates for the Latching Material and/or the Dielectric Support Axes Unlike cross-linked polymers, uncross-linked polymers can be liquified though they do not always have a precise melting point. For the Dielectric Support Axes, cross-linked polymer is preferable to uncross-linked polymer. For the liquifiable latching material, the uncross-linked polymer is necessary. There are many plastics such as for example Nylon, ABS copolymers and Polymethyl Methacrylate besides the common ones described below.

Low Density Polyethylene (LDPE) is a preferred plastic that is predominantly used in film applications due to its toughness, flexibility and transparency. LDPE has a low melting point of 120° C. making it popular for use in applications where heat sealing is necessary. Typically, LDPE is used to manufacture flexible films such as those used for dry cleaned garment bags and produce bags. LDPE is also used to manufacture some flexible lids and bottles, and it is widely used as insulation in wire and cable applications for its stable electrical properties and processing characteristics.

Polyethylene Terephthalate (PET or PETE) is clear, tough and has good gas and moisture barrier properties making it ideal for carbonated beverage applications and other food containers. The fact that it has high use temperature makes it a candidate for dielectric gimbals and support axes. It is used in applications such as heatable pre-prepared food trays. Its heat resistance and microwave transparency make it an ideal heatable film. It also finds applications in such diverse end uses as fibers for clothing and carpets, bottles, food containers, strapping, and engineering plastics for precision-molded parts.

High Density Polyethylene (HDPE) is used for many packaging applications because it provides excellent moisture barrier properties and chemical resistance. However, HDPE, like all types of polyethylene, is limited to those food packaging applications that do not require an oxygen or CO2 barrier. In film form, HDPE is used in snack food packages and cereal box liners; in blow-molded bottle form, for milk and non-carbonated beverage bottles; and in injection-molded tub form, for packaging margarine, whipped toppings and deli foods. Because HDPE has good chemical resistance, it is used for packaging many household as well as industrial chemicals such as detergents, bleach and acids. General uses of HDPE include injection-molded beverage cases, bread trays as well as films for grocery sacks and bottles for beverages and household chemicals.

Polyvinyl Chloride (PVC) has excellent transparency, chemical resistance, long term stability, good weatherability and stable electrical properties. Vinyl products can be broadly divided into rigid and flexible materials. Rigid applications are concentrated in construction markets, which includes pipe and fittings, siding, carpet backing and windows. PVC's success in pipe and fittings can be attributed to its resistance to most chemicals, imperviousness to attack by bacteria or micro-organisms, corrosion resistance and strength. Flexible vinyl is used in wire and cable sheathing, insulation, film and sheet, floor coverings, synthetic leather products, coatings, blood bags and medical tubing.

Polypropylene (PP) has excellent chemical resistance and is commonly used in packaging. It has a high melting point, making it more suitable for dielectric gimbals and support axes. Polypropylene is found in everything from flexible and rigid packaging to fibers for fabrics and carpets and large molded parts for automotive and consumer products. Like other plastics, polypropylene has excellent resistance to water and to salt and acid solutions that are destructive to metals. Typical applications include ketchup bottles, yogurt containers, medicine bottles, pancake syrup bottles and automobile battery casings.

Polystyrene (PS) is a versatile plastic that can be rigid or foamed. General purpose polystyrene is clear, hard and brittle. Its clarity allows it to be used when see-throughability is important, as in medical and food packaging, in laboratory ware, and in certain electronic uses. Expandable Polystyrene (EPS) is commonly extruded into sheet for thermoforming into trays for meats, fish and cheeses and into containers such as egg crates. EPS is also directly formed into cups and tubs for dry foods such as dehydrated soups. Both foamed sheet and molded tubs are used extensively in take-out restaurants for their lightweight, stiffness and excellent thermal insulation.

Scope of the Invention

While the instant invention has been described with reference to presently preferred and other embodiments, the descriptions are illustrative of the invention and are not to be construed as limiting the invention. Thus, various modifications and applications may occur to those skilled in the art without departing from the true spirit and scope of the invention as summarized by the appended claims together with their full range of equivalents. It is to be understood that in said claims, ingredients recited in the singular are intended to include compatible combinations of such ingredients wherever the sense permits. It should be recognized that the methods and apparatus of this invention can be used in other contexts than those explicitly described herein. It is also to be understood that the following claims are intended to cover all of the generic and specific features of the invention herein described, and all statements of the scope of the invention which, as a matter of language, might be said to fall there between.

The invention claimed is:

1. A solar concentrator system, for directing and concentrating solar radiation onto a power production solar receiver, comprising
   a) an array of at least one adjustable optical unit;
   b) said unit mounted on at least one pivot;
   c) said optical unit acted on by a torque;
   d) said torque causing rotation of said optical unit;
   e) said rotation being about said pivot;
   f) a support axis joining said optical unit with said pivot;
   g) said pivot immersed in a latching material;
   h) said latching material comprising at least one element of a group of low melting point chemical elements;
   i) said low melting point being between 10° C. and 300° C.;
   j) said pivot is latched by a freezing of said latching material about said pivot;
   k) said pivot is unlatched by a melting of said latching material; and
   l) wherein said latch is unlatched by heating said latching material above its melting point by means of a resistor inductively coupled to a power supply, in which said resistor is in a group consisting of a resistor within the pivot and a resistor within the latching material.

2. The apparatus of claim 1, wherein at least one of said low melting point chemical elements is selected from the group comprising bismuth, gallium, indium, iodine, and rubidium.

3. The apparatus of claim 1, wherein said pivot remains latched without the application of any power.

4. A method of latching at least one free member of an optical solar concentrating system comprising the steps of
   a) mounting said member on at least one pivot;
   b) torque coupling of said member;
   c) said member being caused to rotate by said torque;
   d) rotating said member about said pivot;
   e) immersing said pivot in a latching material;
   f) said latching material comprising at least one element of a group of low melting point chemical elements;
   g) said low melting point being between approximately 10° C. and approximately 300° C.;
   h) latching said pivot by freezing latching material about said pivot;
   i) unlatching said pivot by melting of said latching material; and j) wherein said latch is unlatched by heating said latching material above its melting point by means of a resistor inductively coupled to a power supply, in which said resistor is in a group consisting of a resistor within the pivot and a resistor within the latching material.

5. The method of claim 4, wherein at least one of said low melting point chemical elements is selected from the group comprising bismuth, gallium, indium, iodine, and rubidium.

6. The method of claim 4, wherein said pivot remains latched without the application of any power.

7. A solar concentrator system, for directing and concentrating solar radiation onto a power production solar receiver, comprising
   a) an array of at least one adjustable optical element;
   b) said element mounted on at least one pivot;
   c) said optical element acted on by a torque;
   d) said torque causing rotation of said optical element;
   e) said rotation being about said pivot;
   f) a latch positioned to prevent rotation; and
   g) said element being free to rotate until latched;
   h a support axis joining said optical element with said pivot;
   i) said pivot immersed in liquid latching material;
   j) said latch is latched by a freezing of said liquid latching material about said pivot;
   k) said latch is unlatched by a melting of said latching material; and
   l) wherein said latch is unlatched by heating said latching material above its melting point by means of a resistor inductively coupled to a power supply, in which said resistor is in a group consisting of a resistor within the pivot and a resistor within the latching material.

8. The apparatus of claim 7, wherein at least one of said low melting point chemical elements is selected from the group comprising bismuth, gallium, indium, iodine, and rubidium.

9. The apparatus of claim 7, wherein said pivot remains latched without the application of any power.

10. The apparatus of claim 7, wherein said latching material has a low melting point between 10° C. and 300° C.

* * * * *